United States Patent Office 3,019,679
Patented Feb. 6, 1962

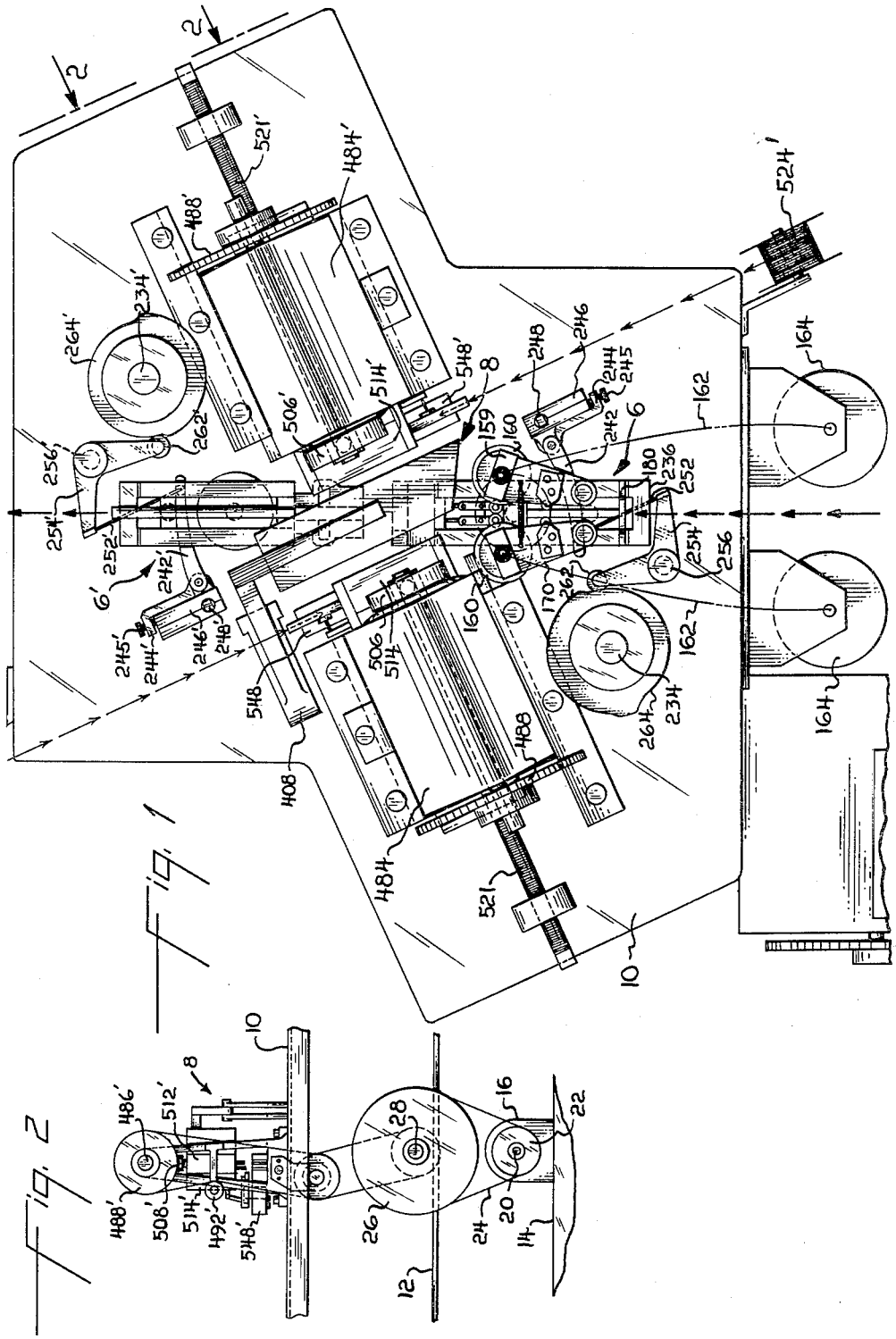

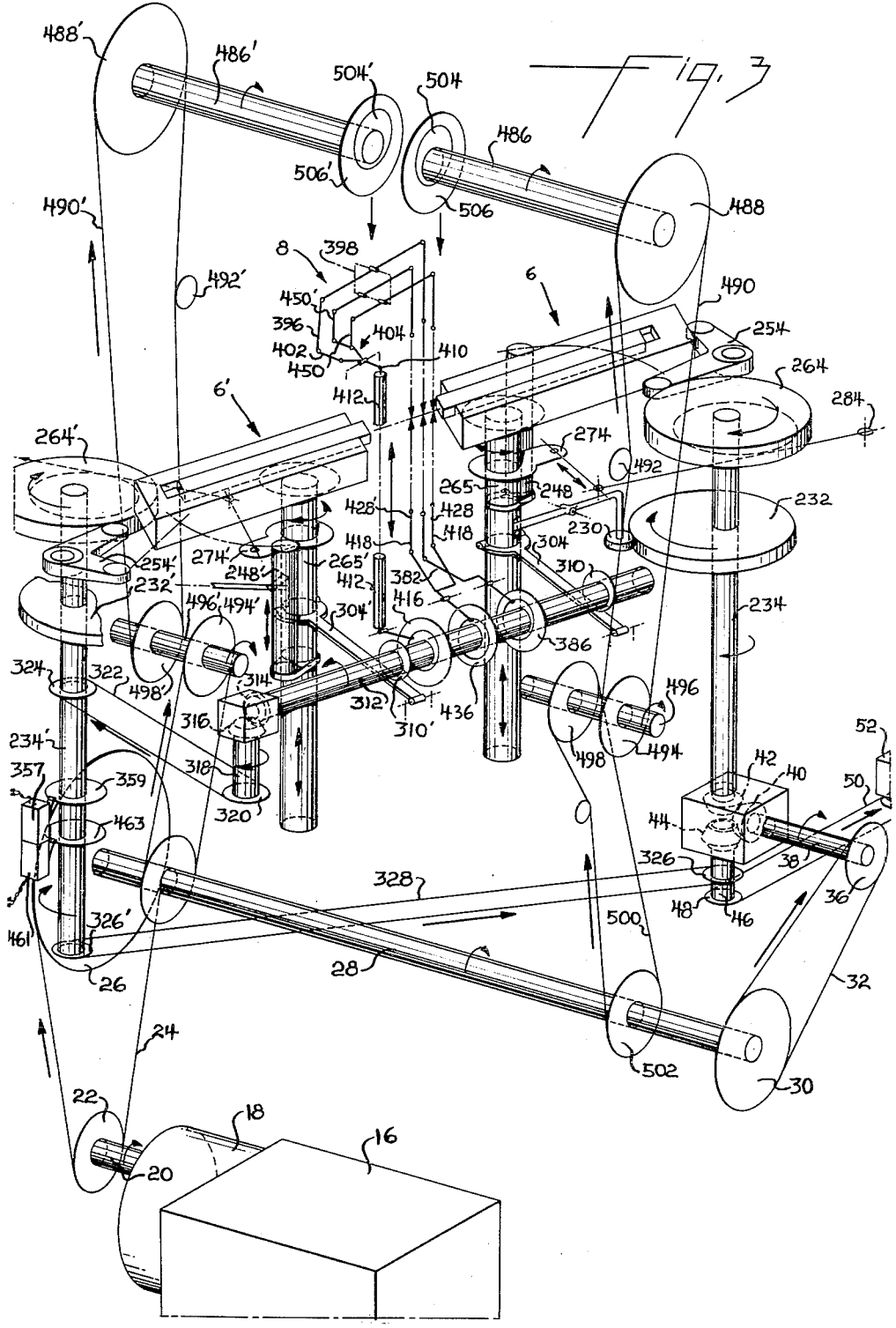

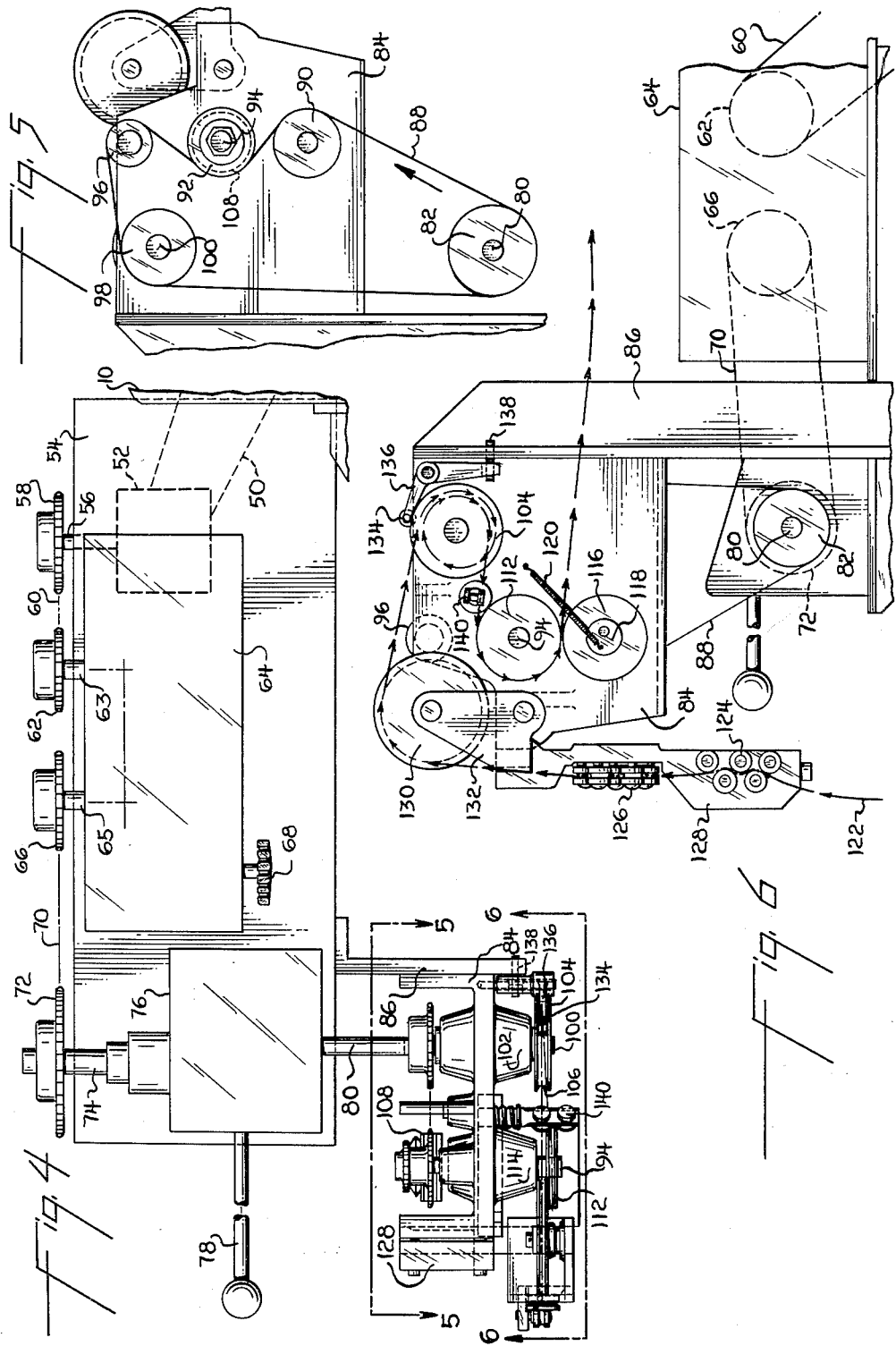

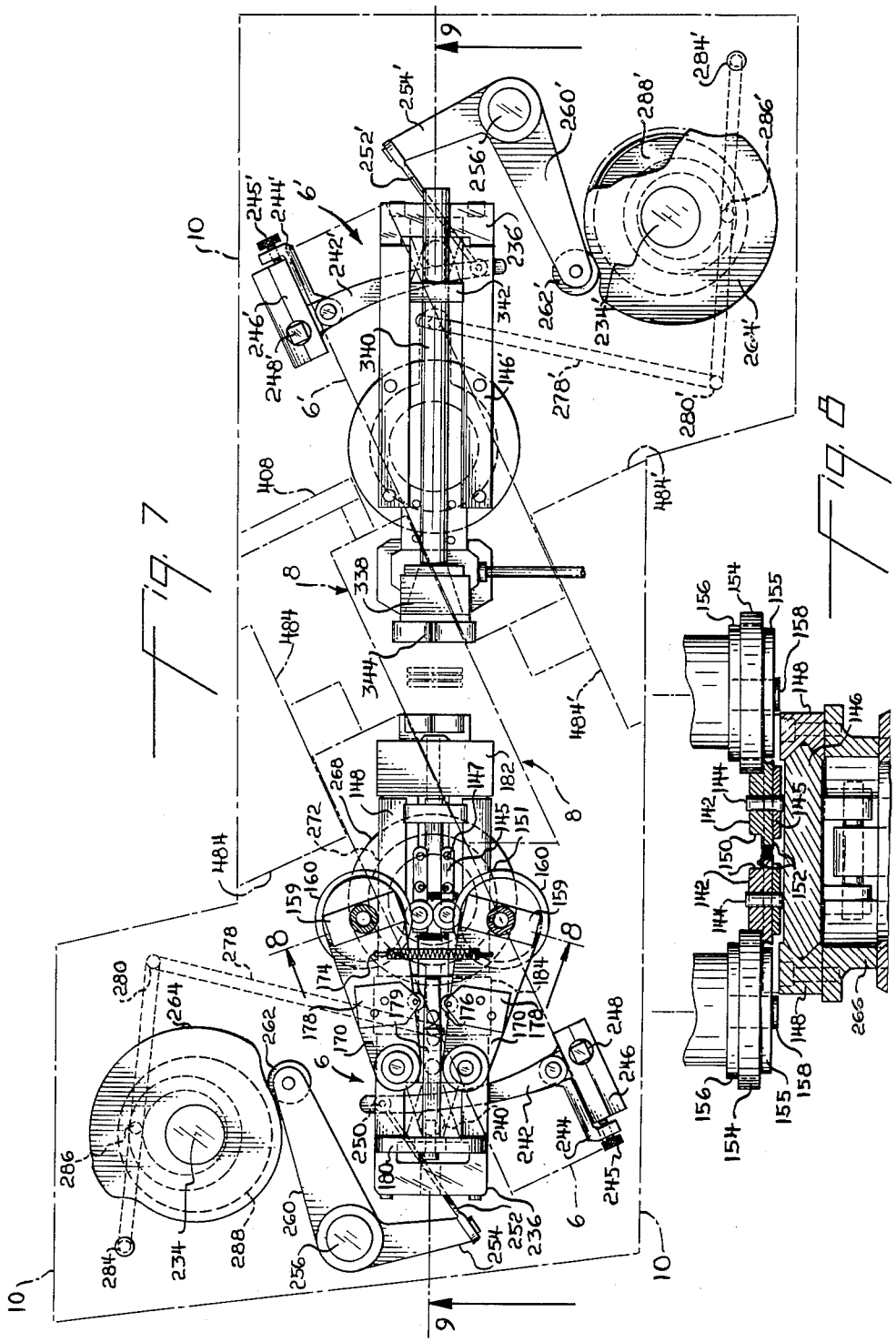

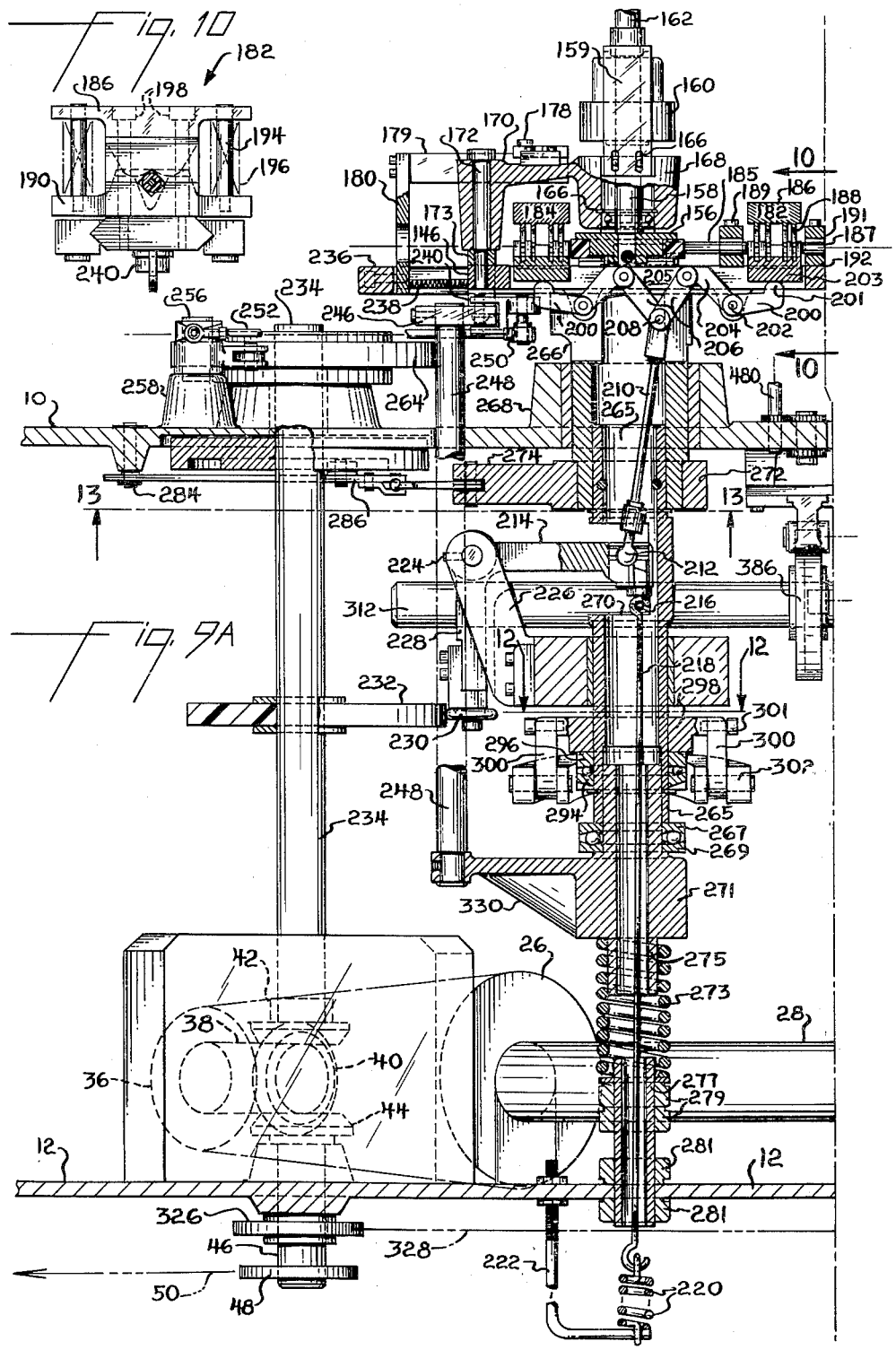

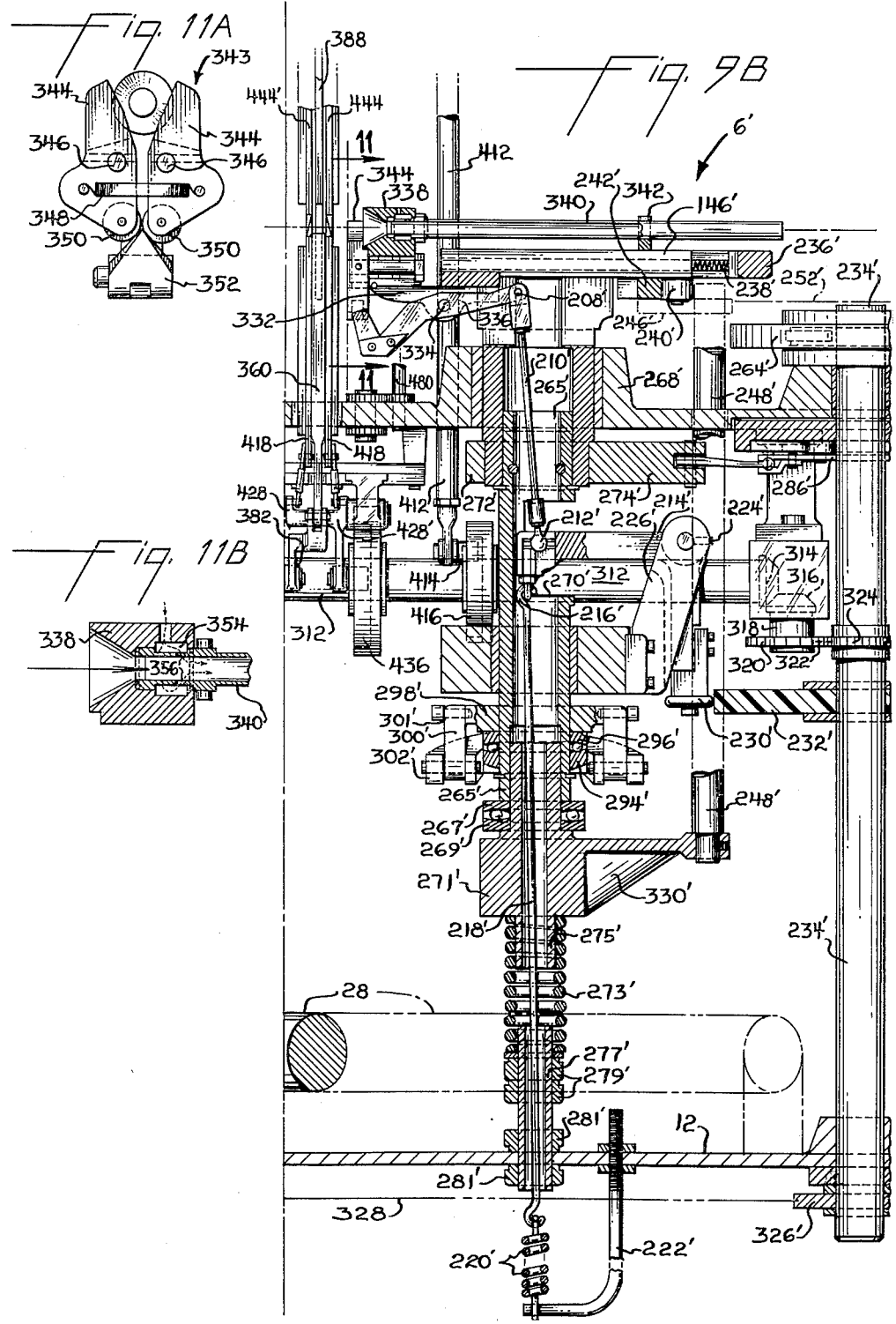

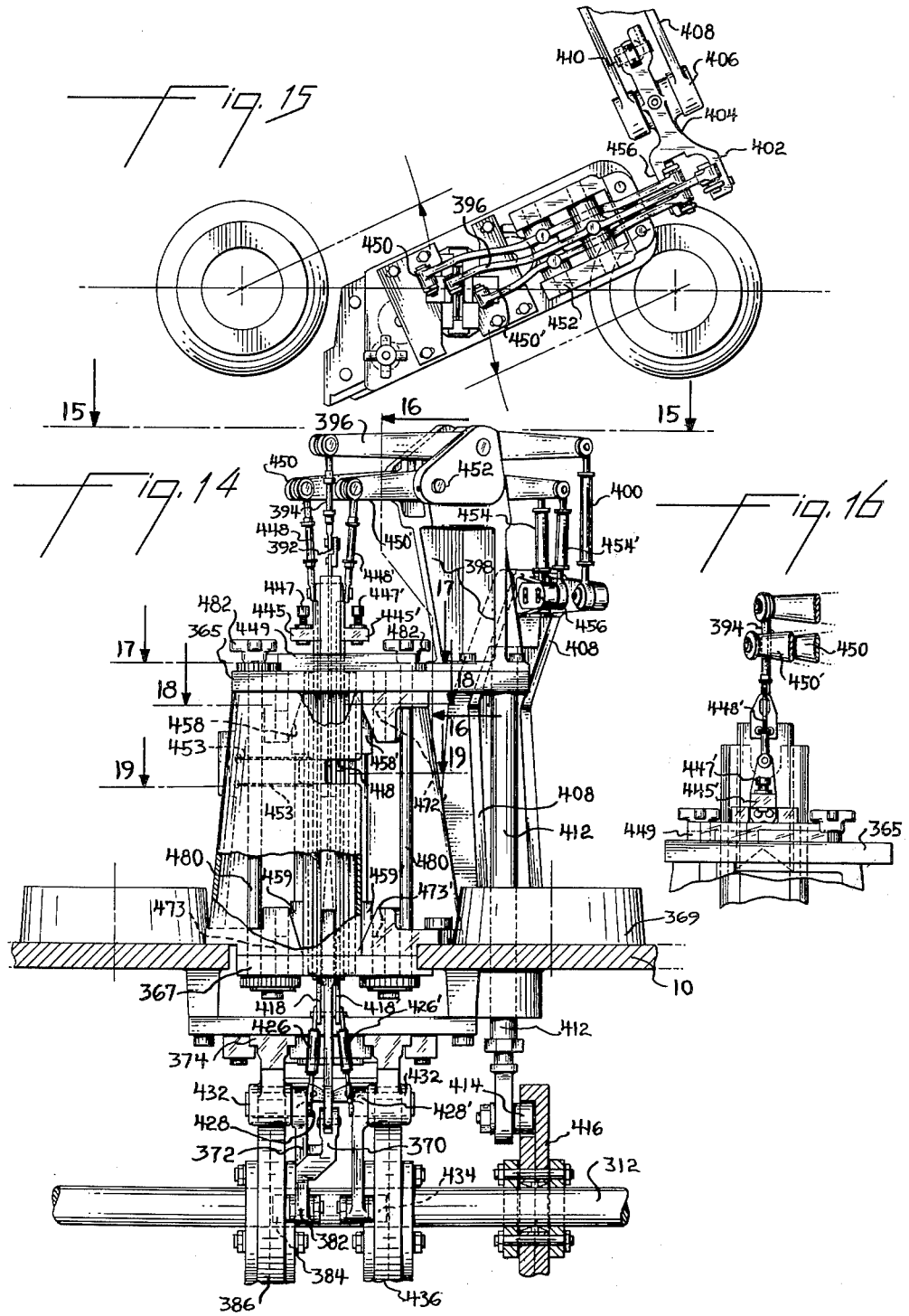

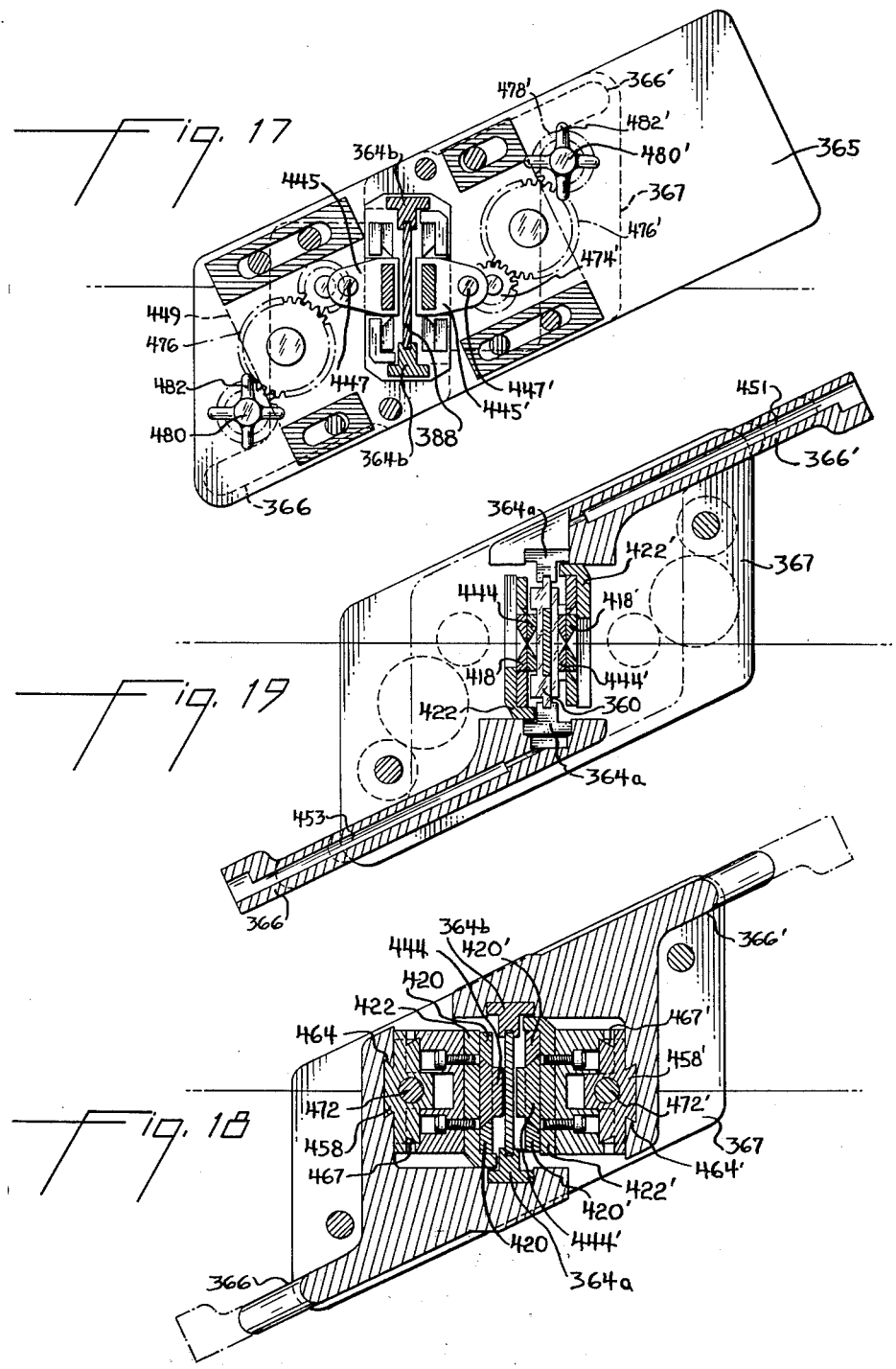

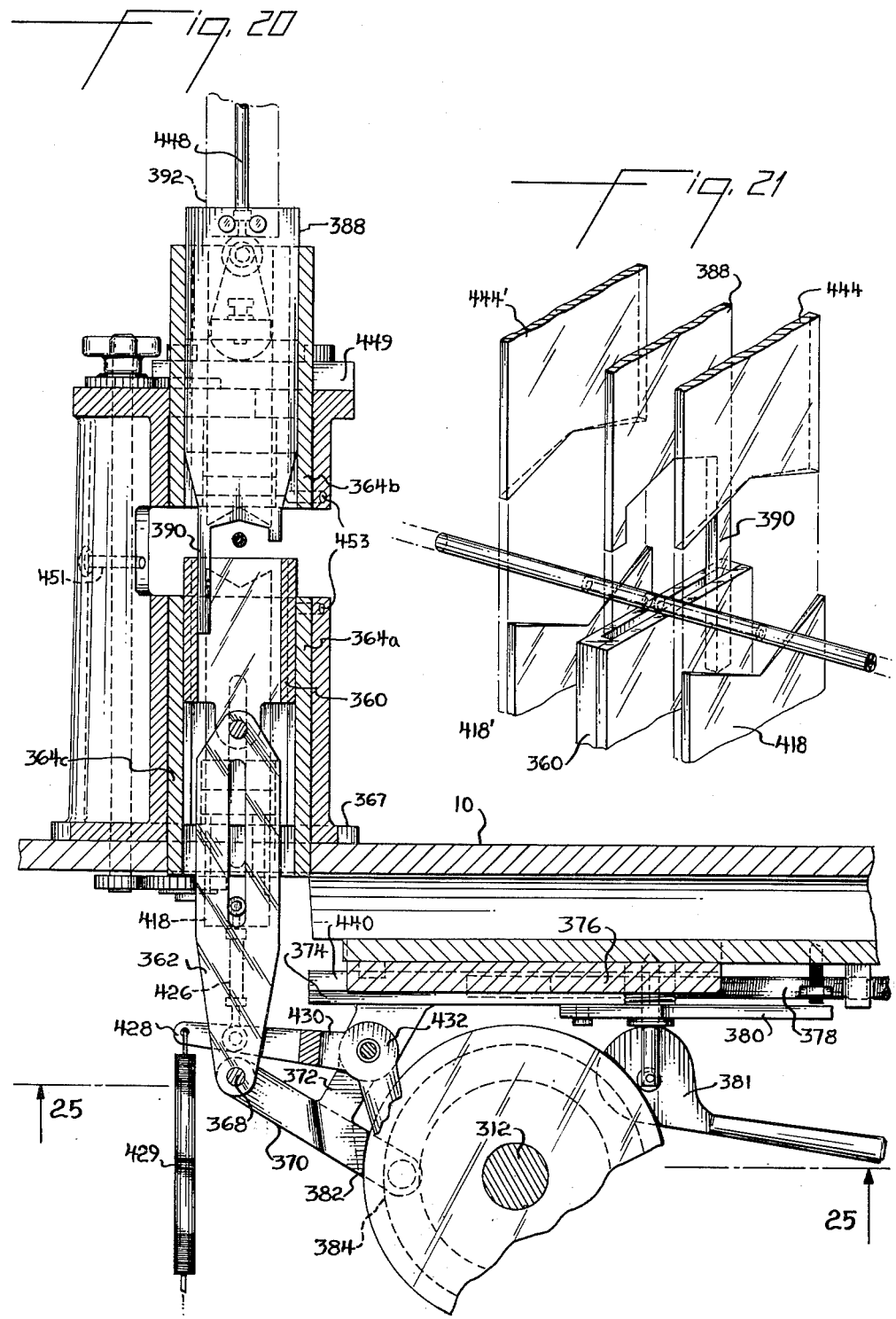

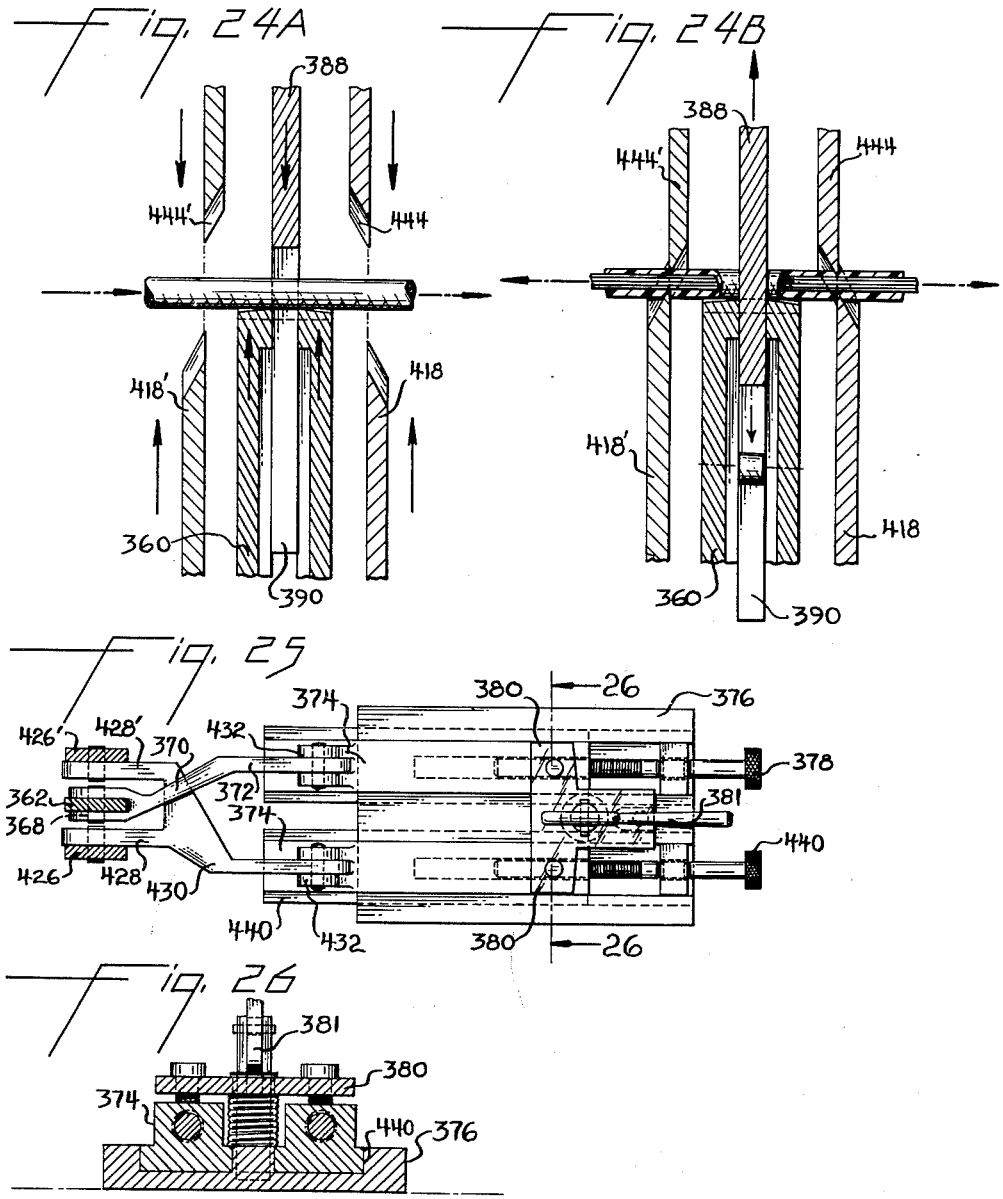

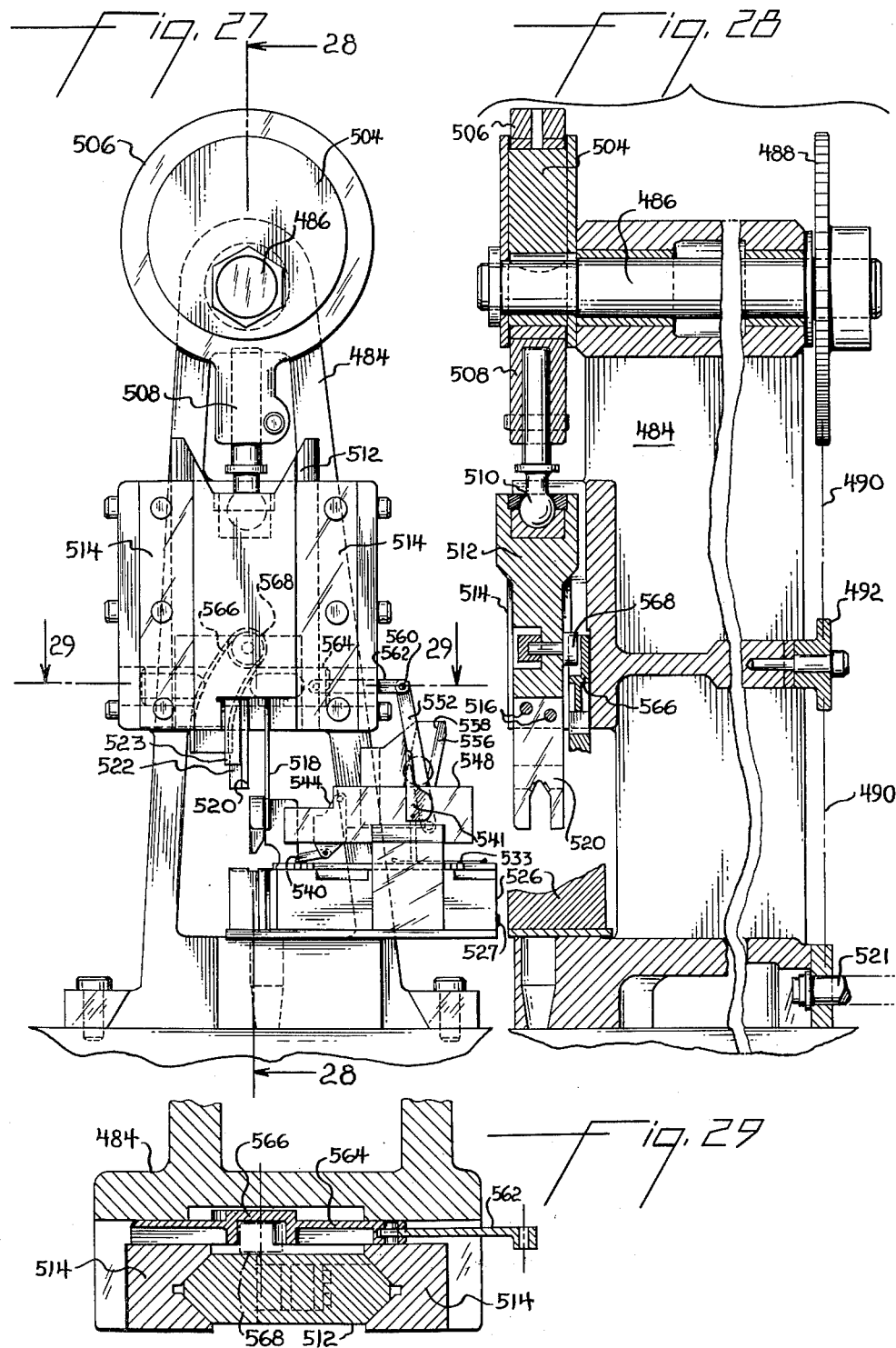

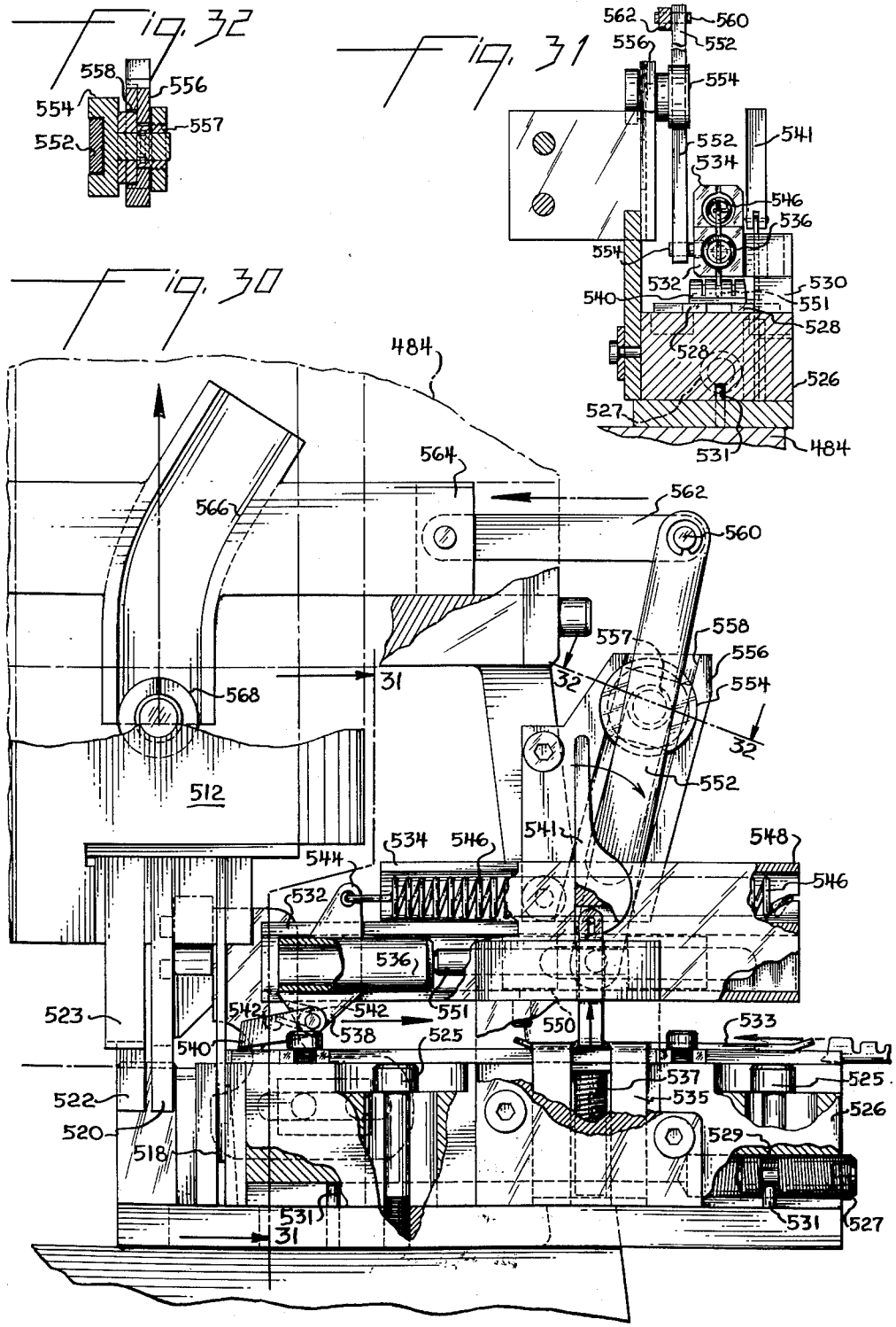

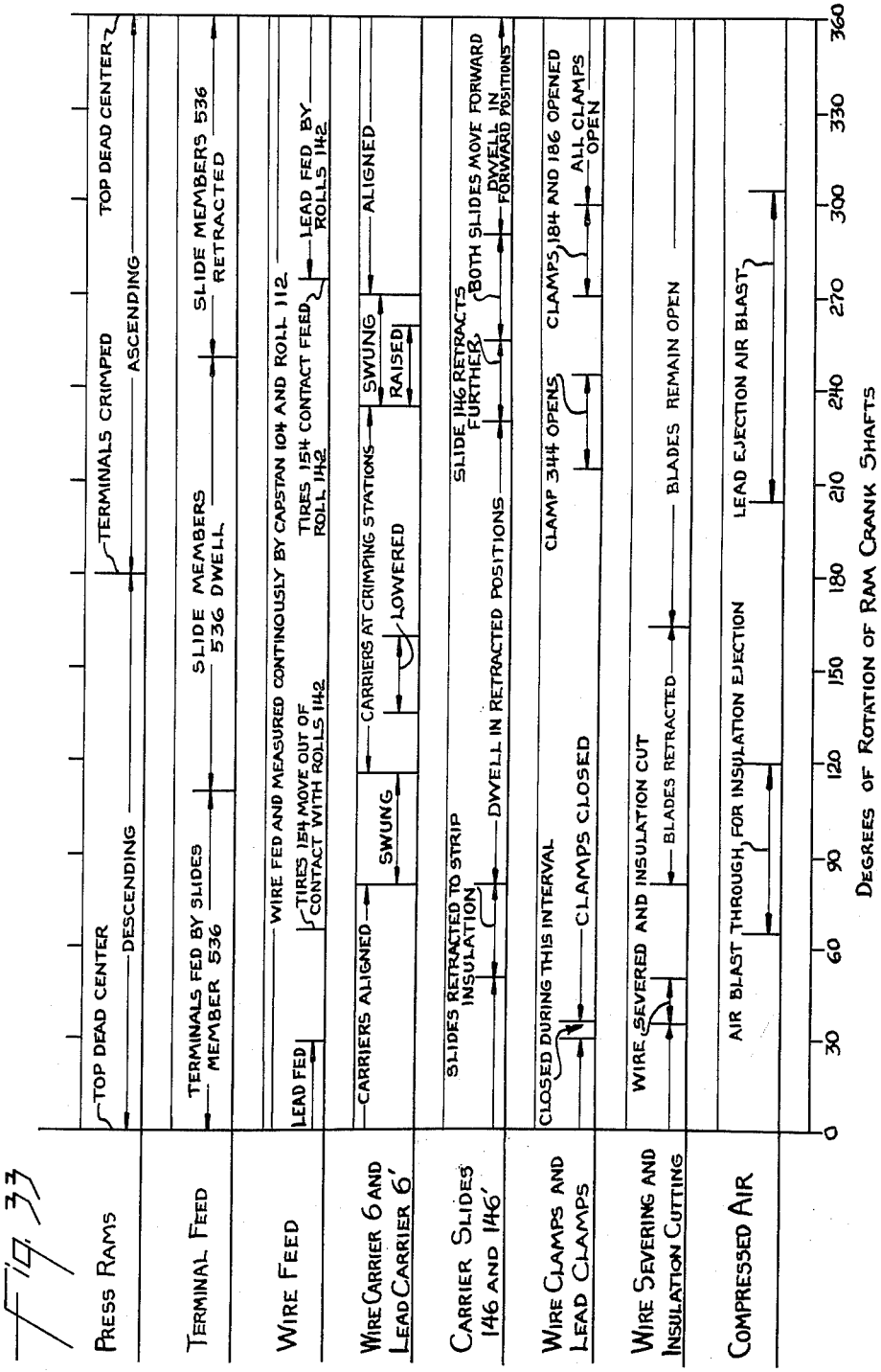

3,019,679
LEAD MAKING MACHINE
Glendon H. Schwalm and Robert Ullman, Harrisburg,
Pa., assignors to AMP Incorporated, Harrisburg, Pa.
Filed July 15, 1958, Ser. No. 748,722
3 Claims. (Cl. 81—9.51)

This invention relates to apparatus for the manufacture of electrical leads having a terminal secured to one or both ends thereof. An object of the invention is to provide an improved lead-making apparatus having a high degree of adjustability for varying lengths of leads and sizes and types of terminals. A further object is the provision of an apparatus capable of high operating speeds. A further object is the provision of an apparatus in which the necessary changes required when changing the type of terminal or the length of the lead can be accomplished in a minimum of time.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a top plan view of an apparatus in accordance with the invention showing the crimping press, the wire and lead transfer mechanisms, and the lead severing mechanism;

FIGURE 2 is a view taken along the lines 2—2 of FIGURE 1;

FIGURE 3 is a semi-diagrammatic perspective view of the various power transmission shafts, cam shafts, cams and the linkages by means of which power is transmitted to the various components of the apparatus. This view is taken from a position in the upper left hand portion of FIGURE 1 looking obliquely down into the apparatus;

FIGURE 4 is a top plan view of a wire measuring and feeding apparatus which forms part of the preferred embodiment and which is located adjacent the structure shown in FIGURE 1;

FIGURE 5 is a view taken along the lines 5—5 of FIGURE 4;

FIGURE 6 is a view taken along the lines 6—6 of FIGURE 4;

FIGURE 7 is a top plan view of the central portion of the operating zone showing the wire transfer mechanism and the lead transfer mechanism by means of which the severed lead and the wire are transferred from the severing device to the crimping presses;

FIGURE 8 is a view taken along the lines 8—8 of FIGURE 7;

FIGURES 9A and 9B are sectional views taken along the lines 9—9 of FIGURE 7, these views being arranged such that a continuous view can be produced by folding along the broken lines marking the ends of the views and placing the sheets against each other;

FIGURE 10 is an end view of a wire clamp on the wire transfer mechanism taken along the lines 10—10 of FIGURE 9A;

FIGURE 11A is an end view of a wire clamp on the lead transfer mechanism taken along the lines 11—11 of FIGURE 9B;

FIGURE 11B is an enlarged sectional view of a guide block on the lead transfer mechanism showing pneumatic ejection means for ejecting the finished lead;

Figure 13:
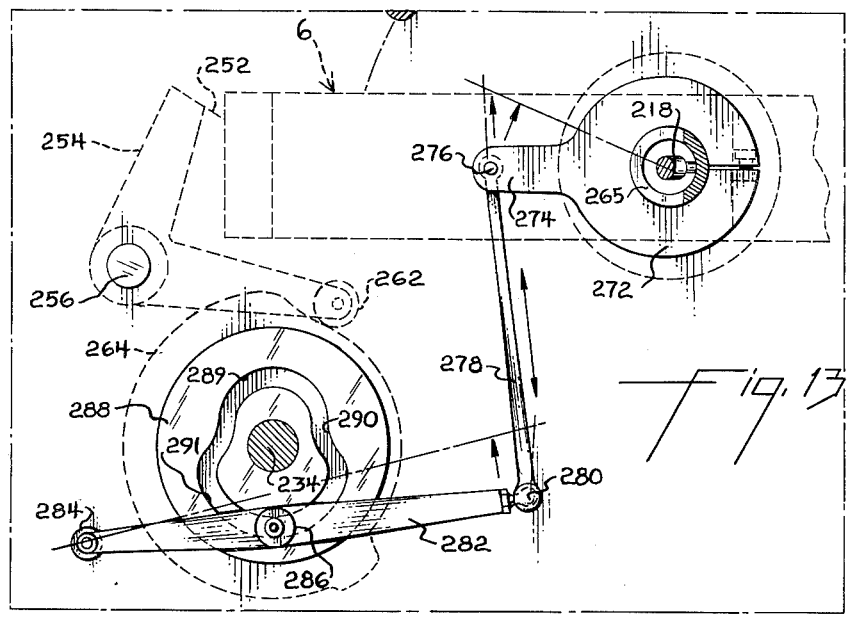
Figure 12:
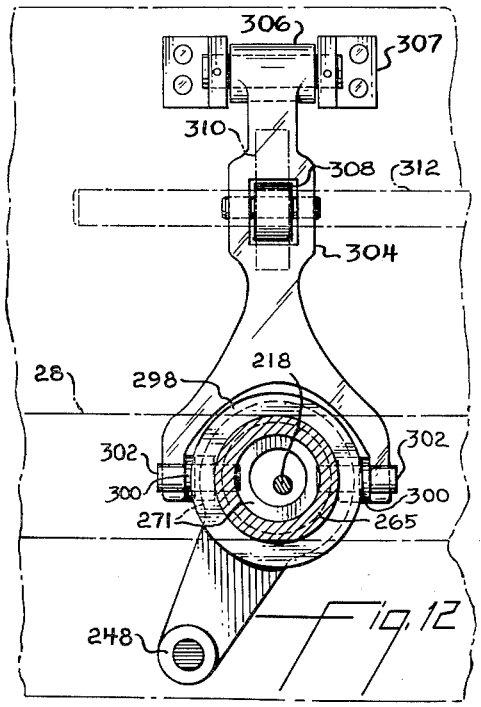
Figure 23:
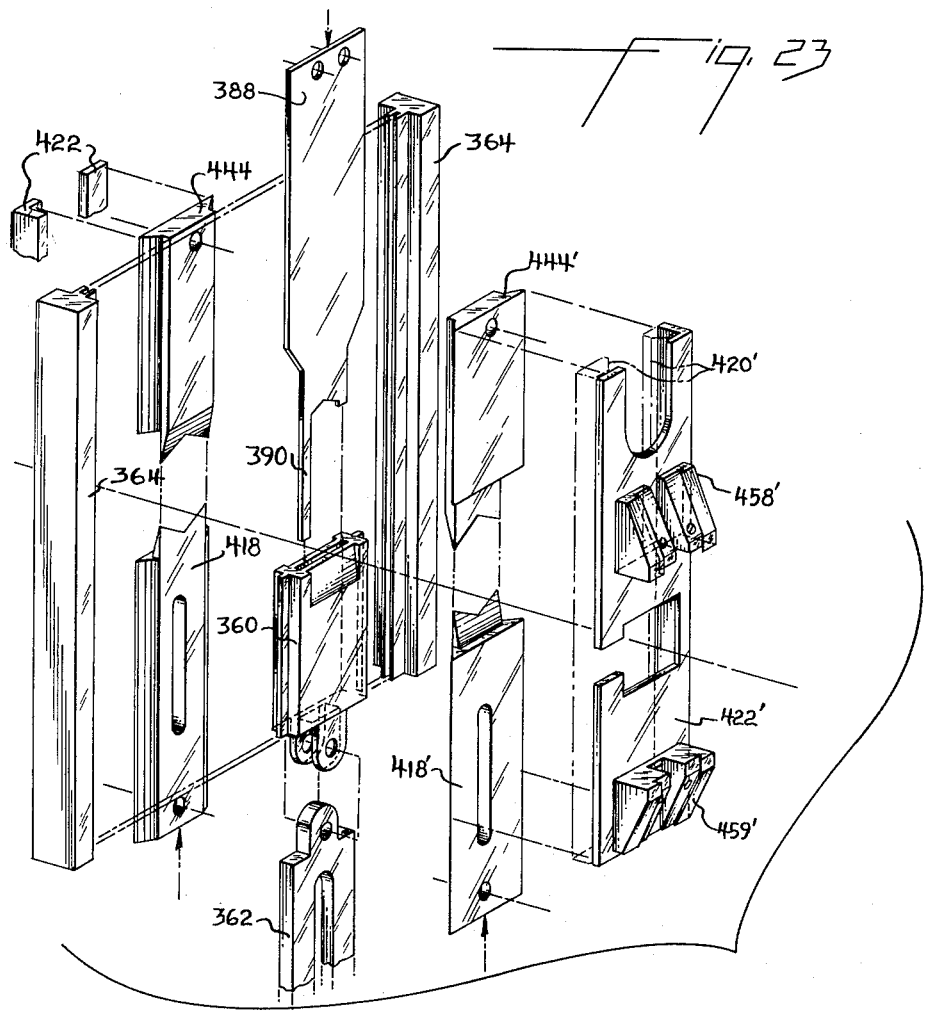
Figure 22:
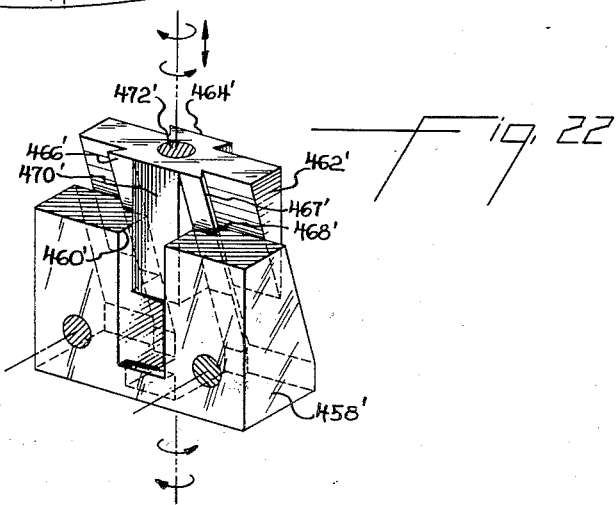

FIGURES 12 and 13 are views taken along the lines and looking in the directions of the arrows 12—12 and 13—13 respectively of FIGURE 9A;

FIGURE 14 is a side view of the wire severing and insulating cutting mechanism;

FIGURE 15 is a view taken along the lines 15—15 of FIGURE 14;

FIGURE 16 is a fragmentary end view taken along the lines 16—16 of FIGURE 14 and showing a portion of the linkage by means of which the upper wire severing and insulation cutting blades are actuated;

FIGURES 17, 18 and 19 are sectional views taken along the lines 17—17, 18—18 and 19—19 of FIGURE 14;

FIGURE 20 is a sectional end view taken through the wire severing and insulation cutting mechanism and showing the manner in which the lower wire severing and insulation cutting blades are actuated and adjusted for various wire sizes;

FIGURE 21 is a fragmentary respective view showing the relationships between the wire severing blades and the insulation cutting blades when in severing and cutting relationship to the wire;

FIGURE 22 is a fragmentary perspective view of the adjusting block by means of which the insulation cutting blades are adjusted towards and away from the wire severing blades for the purpose of changing the lengths of the stripped ends of the wire;

FIGURE 23 is an exploded perspective view of some components of the wire severing and insulation cutting cutting mechanism;

FIGURES 24A is a fragmentary sectional view showing the wire severing blades and insulation cutting blades just prior to severing of a lead from a length of fed conductor;

FIGURE 24B is a view similar to FIGURE 24A taken after the severing and cutting operations have been completed;

FIGURE 25 is a view taken along the lines 25—25 of FIGURE 20 and showing the locking means for locking the adjusting means of the wire cutting blades and insulation cutting blades;

FIGURE 26 is a view taken along the lines 26—26 of FIGURE 25.

FIGURE 27 is a frontal view of one of the crimping presses showing the terminal feed mechanism;

FIGURE 28 is a view taken along the lines 28—28 of FIGURE 27;

FIGURE 29 is a view taken along the lines 29—29 of FIGURE 27;

FIGURE 30 is an enlarged view with parts broken away of the terminal feed mechanism and showing the linkage of this feed mechanism to the press ram;

FIGURE 31 is a view taken along the lines 31—31 of FIGURE 30;

FIGURE 32 is a view taken along the lines 32—32 of FIGURE 30; and

FIGURE 33 is a timing diagram of the operating cycle of the apparatus.

The general principles of the operation of the disclosed embodiment can be understood quickly from FIGURE 1. The apparatus comprises a pair of carriers or transfer mechanisms 6, 6' which, during a portion of the operating cycle, are in aligned relationship as shown in FIGURE 1. The wire carrier 6 carries feeding rolls which are intermittently rotated to feed wire from an accumulation of slack wire along the path, shown by the heavy arrows, through a wire severing and insulation cutting mechanism 8, and through the lead carrier 6'. At the conclusion of the feeding portion of the cycle, the severing and insulation cutting means 8 is actuated to sever a lead from the fed wire and to cut insulation adjacent the trailing end of the lead and adjacent the leading end of the wire. The carriers 6, 6' each incorporates means for moving the lead and wire axially away from the plane of severance while the severed sections of insulation are retained by the cutting and severing mechanism 8 so that the insulation is stripped adjacent the trailing end of the lead and the leading end of the wire. Thereafter, each of the carriers 6, 6' swings in a counterclockwise direction as viewed in FIGURE 1 to position the trailing end and the leading end respectively at crimping stations which are beneath the press rams of the presses 484, 484'. Terminals are fed to these crimping stations from reels, the reel for the press 484' being indicated at 524', and the conductors are positioned in the fed terminals. The terminals are crimped onto the leading end and trailing ends and the carriers are then swung back to their aligned position while the completed lead is ejected automatically. The cycle then repeats itself as wire is fed along the wire feed path through the lead carrier 6'.

The disclosed embodiment of the invention is mounted on a suitable support having a top surface 10, an intermediate surface 12, a lower surface 14, and suitable vertical supporting members which are not specifically shown. An electric motor 16 (FIGURES 2 and 3) is mounted on surface 14 and is coupled by means of a variable speed reducer 18 to an output shaft 20 having a sprocket 22 on its end. This sprocket is coupled by means of a chain 24 to a sprocket 26 on one end of a main power shaft 28 which extends horizontally above intermediate surface 12 and is suitably journaled in bearings which are not specifically shown. A sprocket 30 on the opposite end of shaft 28 is coupled by means of a chain 32 to a sprocket 36 on the end of a shaft 38 extending from a right angle drive comprising a bevel gear 40 on the end of shaft 38 and a pair of bevel gears 44, 42. Bevel gear 44 is secured to a shaft 46 which extends downwardly through surface 12 and has a sprocket 48 on its end around which a chain 50 extends to a right angle drive generally indicated at 52 (FIGURE 4). This right angle drive is disposed beneath a support 54 which is contiguous to surface 10, and which has mounted thereon a continuous wire measuring and feeding device which will now be described.

The output shaft 56 which extends from right angle drive 52 has a sprocket 58 on its end which is coupled by means of a chain 60 to a sprocket 62 on the end of an input shaft 63 of an infinitely variable speed transmission contained within a housing 64 on the upper surface of support 54. The output shaft 65 of this transmission has a sprocket 66 on its end coupled by means of a chain 70 to a sprocket 72 on the end of a shaft 74. Infinitely variable speed transmission 64 may be of the well known type comprising a pair of sheaves or pulleys coupled by means of a chain, each sheave being formed in two parts which are adjustable towards and away from each other thereby to vary their effective diameters, such adjustment being achieved by means of an adjusting knob 68. When the effective diameters of the two sheaves are varied, the relative rotational speeds of input shaft 63 and output shaft 65 are varied also.

Shaft 74 extends from a housing 76 containing a sliding gear transmission, also of the well known type having a shift knob 78 extending therefrom and an output shaft 80. It will be appreciated that infinitely variable speed transmission 64 and sliding gear transmission 76 are provided for the purpose of permitting accurate control of the length of wire fed by the wire measuring feeding mechanism described below and for the purpose of providing a wide range in the length of the wire fed during a given feed interval. Alternative arrangements for achieving these results might, of course, be used if desired.

Output shaft 80 has secured to its end a sprocket 82 which is drivingly coupled by means of a chain 18 to the continuously operating a wire feeding and measuring device which is mounted on a plate 84 secured as by welding to a bracket 86 which extends from support 54. Chain 88 passes over an idler sprocket 90, over a sprocket 92 on a shaft 94, over an idler sprocket 96 and over a sprocket 98 secured to a shaft 100. Sprocket 92 is not secured to shaft 94 but is rotatable thereon and is clamped between a pair of plates 108 which are secured to the shaft so that the sprocket is permitted to slip relative to the shaft under some circumstances as described below. Shaft 94 extends through bearing bosses 114 on plate 84 and has keyed to its opposite end a sheave 112 having a peripheral groove therein for the wire. The wire is pressed into this groove by means of a pressure roller 116 which is rotatably mounted on an eccentric 118 on a stub shaft extending from plate 84, a spring 120 being provided resiliently to urge this pressure roller into the groove in sheave 112. Shaft 100 is supported in bearing bosses 102 and has secured to its opposite end a capstan sheave 104 having a peripheral groove 106 therein. This groove has a substantially flat base which is of sufficient width to accommodate at least two side-by-side sections of the wire without overlapping so that a full turn of the conductor can be taken around the sheave.

The wire 122 is drawn from a substantially endless source, such as a reel, through two sets of straightening rolls 124, 126 mounted on a bracket 128 on plate 84. From the straightening rolls, the wire extends over a guide roll 130 mounted between ears 132 and then extends to sheave 104. The wire is wound around this sheave for a full turn and the side-by-side portions of the wire are prevented from overlapping each other in the groove 106 by means of a roller 134 on the end of a bell crank 136 which is adjustably held against the wire by means of an adjusting screw 138. The wire extends from capstan sheave 104 through a guide 140 comprising a pair of idler rollers to sheave 112 around which it extends and which feeds the wire into the intermittently operated set of feed rolls in the conductor carrier, which are referred to above.

In operation, the continuous wire measuring and feeding apparatus in FIGURES 4–6 continuously draws wire from the endless source at a constant rate of feed. In order to accomplish this constant feeding rate, the sheave 104 functions after the manner of a capstan and the wire entering this capstan (the section between roll 130 and sheave 104) and the section of wire leaving the capstan must be lightly tensioned. The wire entering the capstan is tensioned by virtue of the straightening rolls 124, 126 although alternative means such as a brake on the reel of wire might be employed. The wire portion leaving the capstan and extending between sheaves 104 and 112 is tensioned either by making the diameter of sheave 112 slightly greater than that of sheave 104, so that the peripheral speed of the sheave 112 will be greater than sheave 104, or by making sprocket 92 slightly smaller than sprocket 98 which will also have the effect of imparting a slightly greater peripheral speed to sheave 112 than that of sheave 104. In the preferred embodiment both methods of achieving tension in a wire portion between sheaves 104 and 112 are employed. As previously mentioned sprocket 92 is mounted on shaft 94 in such manner that it is permitted to slip relative to the shaft. By virtue of this arrangement the wire portion extending between the two sheaves is not stressed to an unduly high level such as might cause it to break.

Referring now to FIGURES 7, 8, and 9A, a pair of small feed rolls 142 are mounted for free rotation on shafts 144 secured to plates 145. These plates are pivotally mounted at 147 on a slide member 146 contained between gibs 148 which form part of the wire carrier mechanism 6. Plates 145 are normally biased towards each other by means of a spring connecting their lefthand ends as viewed in FIGURE 7 and a screw 151 extends through one of these plates and abuts the other. This screw functions as an adjustable stop to limit the spacing between the feed rolls for different wire sizes. Each of the feed rolls has a smaller diameter portion 150 and a larger diameter portion 152, the larger diameter portions having circumferential grooves therein between which the wire is fed. The smaller diameter portions 150 are in tangential contact during the intermittent feeding with fiber tires 154 clamped by means of plates 155 to drive wheels 156 keyed to the ends of shafts 158. These shafts extend from slip clutches 160 which are supported by brackets 159 on the ends of the housings of flexible shafts 162. The flexible shafts in turn extend from motors 164 (see FIGURE 1) which are continuously driven during operation.

Shafts 158 are mounted by means of bearings 166 in bosses 168 on the ends of arms 170 which are pivotally mounted at their opposite ends by means of bosses on pins 172 which in turn are mounted on a plate 173 secured to slide member 146. Support brackets 159 are also supported at their lower ends on bosses 159 as shown in FIGURE 9A. A spring 174 normally biases these arms towards each other so that the fiber tires normally are resiliently urged against the smaller diameter portions 150 of the feed rollers. When these fiber tires are in tangential contact with the roller in this manner, the rollers are driven and feed the wire through the wire transfer mechanism, through the wire severing and insulation cutting device, and through the lead transfer mechanism or carrier 6'.

In the disclosed embodiment, the feeding of the conductor by rolls 142 is stopped at the conclusion of the intermittent feeding portion of the cycle by clamping the wire on each side of these feed rolls and by subsequently disengaging the fiber tires 154 from the feed rolls. The fiber tires are disengaged by means of cam rollers 176 carried between brackets mounted on arms 170, which bear against a cam 178 on the end of an arm 179 extending from an end piece 180 which is mounted on the ends of gibs 148. End piece 180 is therefore stationary with respect to the conductor carrier 6 and particularly with respect to the slide member 146. When slide member 146 moves to the left from the position of FIGURE 9A in order to effect the stripping of the conductor, as described below, arms 170 also move to the left as viewed in FIGURE 9A. During such movement, cam 178 biases these arms away from each other against the force of spring 174 and the fiber tires 154 are thereby disengaged from feed rolls 142.

Clamping of the conductor at the conclusion of the lead feeding portion of the cycle advantageously takes place a short time before disengagement of the fiber tires from the feed rolls and is accomplished by means of a pair of clamps 182, 184 which will now be described. Since these clamps are substantially alike and are actuated by the same linkages, a description of one will suffice for both. Referring to FIGURE 10 it can be seen that clamp 182 comprises an upper part 186 and a lower part 190. Upper part 186 provides depending flanges 188 which are notched centrally while lower part 190 provides a trough-like cross section across which the wire is fed. The lower part is slotted transversely of the trough for reception of the flanges to permit relative movement of the two parts towards each other when the wire is clamped. The two parts, 186 and 190, are secured together by means of shoulder bolts 193 which permit movement of the lower part 190 towards and away from upper part 186. Guides 194 extend between flanges extending from the edges of the upper part and lower part and springs 196 surround these guides normally to maintain the two parts of each clamp in separated relationship. Upon movement of the lower portion 190 toward the upper portion the wire is clamped between the trough portion of lower part 190 and the notched flanges 188 of the upper part.

Such movement of the lower portion of the clamps is effected by means of bell crank levers 200 each having a rounded bearing portion 201 on one of their arms which rounded bearing portions bear against the undersides of extensions 203 on the lower parts 190 of the clamps, which extensions are received within a slot 205 in the slide member. These bell cranks are pivoted at 202 to ears depending from the underside of slide member 146 and the other arms 204 of the bell cranks are pivotally connected to links 206 which in turn are pivoted at a common clevis 208 on the end of a push rod 210. The push rod in turn at its opposite end has a universal pivotal connection 212 with one arm 214 of a bell crank pivoted at 224. A rod 218 also is connected to arm 214 by means of a hook 216 and this rod extends downwardly through surface 12 to a spring 220 which in turn is anchored by means of an L-shaped bracket 222 bolted to, and depending from, surface 12. The pivot 224 of the bell crank is on the end of an arm 226 extending from a hub described below, and the other arm 228 of this bell crank has a roller 230 on its end which is engaged by a cam 232 secured to a vertical shaft 234. As best shown in FIGURE 3, shaft 234 is coupled to previously referred to stub shaft 38 by means of the bevel gears 40 and 42 so that this shaft continuously rotates during operation.

The clamps 184, 186 are normally maintained in clamping engagement with the wire by virtue of the influence of spring 220 which biases rod 218, push rod 210, and links 206 downwardly thereby to cause pivoting of bell cranks and to urge the lower parts 190 of the clamps upwardly against the upper parts 186. However, during the portion of the operating cycle when the wire is being fed by the feed rolls 142, cam 232 engages roller 230 and rotates bell crank 214 in a counterclockwise direction (as viewed in FIGURE 9A) about its pivot point 224. During this interval, push rod 210 is pushed upwardly against the force of spring 220 and bell crank levers 200 are rotated about their pivotal axes 202 in such manner as to disengage bearing portions 201 from lower clamp parts 190 which are then urged away relatively downwardly from upper parts 186 of the clamps under the influence of the springs 194.

It will be noted that the wire is guided from the feed rolls to the clamp 182 by means of a guide tube 185 mounted in a bracket 189 carried by slide member 146. Advantageously an additional guide tube 187 is mounted in a bracket 192 in order to accurately guide the wire to the wire severing and insulation cutting device 8.

In use, the speed changing mechanisms 64, 76 are set so that the feeding and measuring apparatus of FIGURES 4–6 measures and feeds, during the cycling time of the apparatus, the length of wire desired in the finished leads. During operation, and assuming that the conductor carriers 6, 6' are in alignment as shown in the full lines of FIGURE 7, the clamps 184, 186 are opened by cam 232 and slide member 146 first moves from its retracted position to the position shown in FIGURE 9A (from the left to the right of FIGURE 9A) thus to bring the fiber tires 154 of the drive wheels 156 into contact with the reduced diameter portions 150 of the feed wheels 142. Feeding of the conductor by rolls 142 then starts and during the brief interval available for feeding of the lead, the slack which has been accumulated by the feed mechanism of FIGURES 4–6 during the previous cycle is projected through the wire severing and insulation cutting device 8 and through lead carrier mechanisms 6'. Thereafter, the clamps are closed, the slide 146 retracts and tires 154 are disengaged from the feed rolls.

Advantageously, for accurate control of the length of the leads produced, the rate of feed of the rolls 142 should be sufficient to feed, during their brief feeding interval, an amount of wire slightly greater than the length of the leads being made in order to assure that all of the accumulated slack measured and fed by the mechanism of FIGURES 4–6 will in fact be fed through wire severing device 8 and lead carrier 6'. Where the feeding rate of rolls 142 is sufficient to accomplish this, the conductor extending between the measuring and feeding device of FIGURES 4–6 and the feed rolls 142 will be lightly stressed toward the end of the lead feeding interval and slippage may occur during a brief period. In order to avoid damage to the wire, it is preferable that this slippage take place at some place other than between the wire and the larger diameter portion of the feed rolls. The slip clutches 160 are provided for the purpose of taking up this slippage, however, when the apparatus is being operated at high speed, it will sometimes be found that the slip clutches will not be instantaneously effective and some slippage will take place in the vicinity of the feed rolls. During the brief interval before the slip clutches are effective, it is desirable that the slippage take place between tire 154 and the reduced diameter 150 of the feed rolls rather than between the enlarged diameter 152 of the feed rolls and the wire. The particular arrangement of providing a reduced diameter section 150 on the rolls contributes to this result in that the torque developed between reduced diameter portion 150 and fiber tire 154 is developed on a shorter lever arm than the torque developed between the wire and the enlarged diameter 152, these lever arms being measured from the axis of the shafts 144 to the peripheries of the reduced diameter portion and the enlarged diameter portion. The frictional force between the wire and feed rolls which is required to bring feed rolls 142 to a halt after the accumulated wire has been fed, is reduced by virtue of the longer lever arm and slippage preferentially takes place on tire 154. Of course, the feed rolls do creep slightly after the accumulated slack has been taken up and feed the wire as it is measured and fed by the measuring and feeding device of FIGURES 4–6. It should be added that the slippage of tires 154 rather than feed rolls 142 can also be encouraged by judicious selection of materials to provide a higher frictional coefficient between the wire and feed rolls than exists between the tires and feed rolls.

An advantage of the two-diameter feed rolls shown in that high rates of wire feed are obtainable since the feed rolls are driven on their small diameter portions to give them a high rotative speed, and feed wire on their larger diameter portions, to give them a high peripheral speed.

At the conclusion of the feeding cycle the clamps 182 and 184 are closed onto the wire as described above and slippage continues to take place in the clutch, for a very brief interval before the rolls are disengaged from the feed wheels. When the rolls 142 come to a stop and the speed of the motors 164 will also be reduced because of the load applied to them. However, when the fiber tires of the feed wheels 156 are disengaged from the rolls the motors quickly reattain their maximum speed so that when the rolls are again engaged by the fiber tires, the tires are rotating at their maximum desired speed and the feeding of the wire on the next cycle takes place at the rapid rate which is desirable. The feed rolls and tires 154, 156 remain disengaged from each other during the period when the insulation is stripped and the carrier 6 is oscillated to position the wire ends at the crimping press. The tires reengage the feed wheels only after the carrier has returned to the position of FIGURE 1 and a new feeding cycle starts.

The wire carrier 6 and the mechanism by means of which the wire is stripped and positioned at the crimping station will now be described in detail.

As previously mentioned slide member 146 is reciprocable between gibs 148 and is capable of movement from the position of FIGURE 9A to the left. Guide rods extend from end piece 236 into openings in slide member 146 and springs 238 surround these guide rods normally to bias the slide member to the right as viewed in FIGURE 9A. The slide 146 is retracted (i.e. moved leftwardly in FIGURE 9A) against the force of the springs by means of a roller 240 (FIGURE 7) mounted on its underside which bears against an arcuate cam lever 242 pivoted to an L-shaped bracket 244. This L-shaped bracket is slidably mounted, by means of a dove-tail connection or the like, on a block 246, an adjusting screw 245 being provided for adjusting the bracket to a desired position. This adjustability feature of bracket 244 is for the purpose of permitting the travel of lever 242 and slide 146 to be changed for different sizes of terminals. Block 246 is secured to the end of a rod 248 to which reference will be made below. The end of the lever 242 has a universal pivotal connection 250 with a connecting link 252, the opposite end of which provides an eye pivotally connected to one arm 254 of a bell crank pivoted at 256 on a stub shaft mounted in a boss 258 on surface 10. The other arm of this bell crank 260 carries a roller 262 on its end which is engaged by a cam 264 keyed or otherwise secured to the upper end of shaft 234.

It will thus be apparent that for each revolution of cam 264, the bell crank pivoted at 256 will be swung in a clockwise direction thus causing lever 242 to be swung in a counterclockwise direction thereby to pull roller 240 and slide member 142 leftwardly against the force of spring 238 as viewed in FIGURE 9A. The bell crank pivoted at 256 is normally biased to the position shown in FIGURE 7 by virtue of springs 238 which urge slide member 142 and roller 240 to the right as viewed in FIGURES 7 and 9A thereby causing rod 252 to urge this bell crank in a counterclockwise direction against cam 264. It will be noted from the shape of cam 264 that retraction of slide 146 takes place in two steps. The second retractive movement of this slide takes place after the crimping operation has been carried out in order that the terminal on the end of the wire will avoid the crimping tooling and is discussed below.

The conductor carrier 6 oscillates through an angle of about 25° after the slide member has been retracted to position the stripped end of the wire at the crimping station. The linkage for oscillating the carrier will now be described.

The gibs 148 are rigidly mounted on a spindle 266 which extends through a boss 268 on surface 10 and is keyed to an extension 265 which projects downwardly into the space between surfaces 10 and 12. Rod 210 extends downwardly through the hollow center portion of this spindle and the spindle extension 265 is cut away as shown at 270 to accommodate the previously mentioned bell crank arm 214. The lower part of spindle 266 has secured thereto a hub 272 having an arm 274 extending therefrom beneath surface 10. As shown best in FIGURE 13, this arm at its end has a universal pivotal connection 276 with a link 278 which in turn is pivoted by means of a universal joint 280 to a lever 282 pivoted at its opposite end 284 to a pin mounted in a boss on the underside of surface 10. Intermediate its ends lever 282 has mounted thereon a cam follower 286 which is received within the race 290 of a cam 288 keyed or otherwise secured to shaft 234. Cam race 290 has a first arcuate portion 289 which forms a circular arc with the center of shaft 234 as a center and a second arcuate portion 291 which forms a second circular arc also with a center of shaft 234 as a center. The arcuate portion 291 is at a distance from the center of shaft 234 which is greater than the distance of portion 289 so that as cam 288 rotates, lever 282 is oscillated about its pivot point 284 thereby causing arm 274 and spindle 266 to be oscillated. The arcuate portions 289 and 291 provide dwells for the carrier in both the aligned relationship of FIGURE 1 and in the nonaligned position when the stripped wire end is positioned at the crimping press. The universal pivotal connections 276, 280 are provided on the preferred embodiment for the reason that spindle 266 and extension 265 are alternately lowered and raised during the cycle and these universal joints permit link 278 to move out of its normal plane during this movement of the spindle.

After the conductor carrier has been oscillated from the aligned position shown in full lines in FIGURE 7 to the dotted line position of FIGURE 7, the carrier is depressed thereby to position the stripped end of the wire in the terminal which is positioned at the crimping station. The mechanism for lowering the carrier will now be described.

A hub 271 provides a reduced diameter extension which projects upwardly into the hollow center of extension 265 and which mounts a ball bearing raceway 269 which is opposed to a raceway 267 which is secured to the lower end of the spindle extension. Ball bearings interposed between these raceways permit rotary motion of the spindle extension 265 relative to the hub. On its underside hub 271 has a tubular projection 275 surrounded by a coil spring 273 which extends downwardly to a stop member comprising a tube 277 having nuts 279 and 281 threaded thereon. Nuts 281 secure the tube to surface 12 and nuts 279 act as a stop for the spring so that hub 271 and spindle extension 265 are normally biased upwardly by the spring.

A ball bearing raceway 294 is secured to extension 265 intermediate its ends and a raceway 296 is rotatably mounted on the spindle extension adjacent raceway 294. Ball bearings interposed between these raceways permit rotation of the spindle extension relative to the mechanism for depressing the spindle which comprises a collar 298 which loosely surrounds the spindle extension so that the spindle can rotate relative to the collar. Links 300 are pivotally connected 301 to ears on the collar and these links are pivoted at 302 on the ends of a bifurcated lever which is pivoted at its opposite end 306 on a suitable bracket 307 extending upwardly from surface 12. A cam roller 308 on this lever intermediate its ends is engaged by a cam 310 which is secured to a cam shaft 312. This cam shaft is continuously driven by a linkage to a vertical shaft 234′ (FIGURE 3) including a bevel gear 314 on the end of shaft 312, a bevel gear 316 on the end of a stub shaft 318, a sprocket 320, and a chain 322 which couples sprocket 320 with a sprocket 324 on shaft 234′. Shaft 234′ is a counterpart to shaft 234 and is described in more detail below.

Cam 310 is arranged such that it depresses lever 304 thereby lowering spindle extension 265, spindle 266 and carrier 6 during the interval when the carrier is in the dotted line position of FIGURE 7 thereby to lower the wire into the terminal.

Since the carrier 6 is lowered during a portion of each cycle, it is also necessary to lower lever 242 which is positioned beneath the carrier. This is accomplished by means of an arm 330 extending from hub 271 which is secured to rod 248. When spindle 266 and extension 265 are lowered by lever 304, hub 271 and arm 330 are also lowered thereby causing rod 248 to be lowered and to carry with it lever 242.

Referring now to FIGURE 9B it will be apparent that lead carrier 6′ is similar in many respects to wire carrier 6 and that the associated devices for oscillating and lowering this carrier are substantially the same as the corresponding mechanisms associated with wire carrier 6. Therefore, the same reference numerals, differentiated by a prime mark, are used with reference to corresponding structural elements associated with the conductor carrier and with the lead carrier and the lead carrier will not be described in detail. The lead carrier has some structural features which are not present on the wire carrier and these structural features are described below and identified by unprimed reference numerals.

Vertical shaft 234′, upon which cams 264′ and 288′ are mounted, is coupled to and drives by stub shaft 46 by means of a sprocket 326′ and a chain 328 as previously mentioned. The lead carrier differs from the wire carrier in that the lead carrier does not have feed rolls and only a single lead clamp is provided which is of somewhat different construction than the wire clamps 182, 184.

As shown best in FIGURE 9B, lead clamp 343 is mounted by means of a bracket 332 secured to the underside of slide 146′ and this bracket has mounted on its end a block 338 having a passageway therein. This passageway has a bell mouth through which the lead is fed and a guide tube 340, supported by a bracket 342 on the slide member. The lead clamp comprises a pair of jaws 344 pivotally mounted on pins 346 which extend into block 338. A spring 348 normally biases the clamping portions of these jaws, which are disposed in front of the bell mouth of block 338, apart and closure of the jaws and clamping of the lead is achieved by means of a wedge 352 which is adapted to enter between two rollers 350 one of which is mounted on each of the jaws 344. Wedge 352 is provided on the end of a lever pivoted at 334 to ears extending from the underside of bracket 332 and is pivoted at its opposite end to push rod 210′ which is in all other respects the counterpart of push rod 210 described with reference to the wire carrier mechanism. Thus, the lead clamping jaws 344 are maintained in the closed position (in clamping engagement with the lead) by virtue of wedge 352 and its linkage through push rod 210′, rod 218′, and spring 220′. The jaws are opened during the feeding interval when cam 232′ engages bell crank arm 228′ thereby to urge push rod 210′ upwardly and oscillate the lever pivoted at 334 counterclockwise about its pivot. The wedge 352 is thereby withdrawn from between rollers 350 allowing the jaws to open under the influence of spring 348.

It is desirable to provide means for ejecting the finished lead after the crimping operation has taken place. To this end the preferred embodiment provides a wind chamber 354 in block 338 and a plurality of ports 356 which communicate with the tube 340. A solenoid actuated valve, not specifically shown, supplies compressed air from a suitable source through an air line to this wind chamber during an interval after the jaws 344 are opened thereby to automatically eject the lead. The solenoid for the valve may be energized by means of a microswitch 357 which is closed by a cam 359 on shaft 234′ (FIGURE 3).

Referring now to FIGURES 14–26, the lead severing and insulation cutting blades and knives are contained within a pair of similar housings 366, 366′. These housings are secured in spaced relationship to each other by means of a top plate 365 bolted to their top surfaces and a base plate 367 bolted to their bottom surfaces and received within an opening in surface 10. The housings are clamped in their proper position on surface 10 by means of clamping blocks 369 which overlap marginal portions of the housings and are bolted to surface 10. Lower guides 364a and upper guides 364b are mounted in opposed surfaces of these housings and slidably accommodate the lower severing die 360 and the upper severing blade 388 respectively. Lower severing die 360 is formed in two pieces (FIGURE 21) with a central passageway therethrough and is connected by means of a link 362 (FIGURE 20) to one arm 370 of a T crank lever. It will be noted that this arm is offset (FIGURE 14) in order that it might extend between the arms of a bell crank described below. Another arm 372 of this lever is pivoted to a bracket extending from a slide 374 and the remaining arm 382 of the lever has a cam follower 384 on its end which is received within the race of a cam 386 secured to shaft 312.

Slide 374, which is mounted on a bracket on the underside of surface 10, is adjustable by means of screw 378 in order to permit variation in the travel of member 360 for varying sizes of wire. Clamping means, including a resiliently biased plate 380 and a clamp 381 are provided to lock slide 374 in any desired position of adjustment.

The upper severing blade 388 is received in guideways 364 band has an extension 390 which extends into the passage in die 360 to function as a guide to ensure that the upper blade will always be in alignment with the opening in the lower die and further to act as a stop for the conductor when the conductor carrier returns from the nonaligned to the aligned position. Blade 388 is pivoted to a blade holder 392 which in turn is pivotally connected to an adjustable link 394 which is pivoted to a lever 396. This lever is pivotally mounted intermediate its ends between the upstanding ears of a bracket 398 which is secured to the top plate 365 and is pivotally connected at its opposite end to a link 400 which extends to a pivotal connection with one arm 402 of a lever 404. Lever 404 in turn is pivoted intermediate its ends on a bracket 408 extending from surface 10 and is pivoted at its opposite end to a push rod 412 which extends downwardly through top surface 10. On its opposite end, push rod 412 provides a cam follower 414 which is received within a race in a cam 416 secured to shaft 312.

As shown in FIGURES 24A and 24B, as shaft 312 rotates, the lower severing die and the upper blade are reciprocated towards and away from each other, and during movement towards each other, a short section of the wire is removed and falls downwardly into a receptacle provided beneath the surface 10. In order to prevent the short section from becoming jammed within the passageway in die 360, this passageway has a greater width immediately below its top surface than at the shearing edge as shown in FIGURE 24A.

Circumferential cutting of the insulation on the trailing end of the lead and on the leading end of the wire is achieved by means of lower insulation cutting knives 418, 418' and upper insulation cutting knives 444, 444' (FIGURES 14 and 19). These knives are reciprocable in guideways 420, 420' which are mounted on plates 422, 422'. Lower insulation cutting knives 418, 418' have pivotal connections at their ends with links 426, 426' which extend to, and are pivotally connected to, the arms 428, 428' of a bell crank 430. Link 362 is slotted as shown in FIGURE 20 to provide clearance for these pivotal connections. This bell crank has a bifurcated arm shown in FIGURES 14 and 20 for the purpose of accommodating each of the links 426, 426' which are on opposite sides of the link 362 on the end of 360. Bell crank 430 is pivoted at 432 to a bracket extending from a slide 440 which is contained between gibs, and this slide like slide 374, is adjustable towards and away from the plane of cutting by means of a screw 442 for the purpose of regulating the travel of the insulation cutting knives. The other arm of bell crank 430 carries a cam roller 434 which is received within a race in a cam 436 mounted on shaft 312. It will thus be apparent that these lower insulating cutting knives reciprocate towards and away from the path of wire feed as does the lower die 360. It is desirable to provide a spring as shown at 429 on one of the arms 428 of the bell crank normally to bias this lever in a counterclockwise direction as viewed in FIGURE 20. The reason for biasing the lever in this manner is to urge the follower 434 against one of the sides of the cam race in cam 436. If this spring is not provided, the cam follower may have some tendency to wobble slightly in the cam race and the travel of the blades 418, 418' will not be closely controlled as is desirable.

The upper insulation cutting knives 444, 444' are pivotally connected at their ends to adjustable links 448, 448' and provide flanges 445, 445' through which adjusting screws 447 extend. During downward movement of these upper cutting blades, the limit of travel of the blades is determined by the position of the screws 447, which contact a cover plate 449 to prevent cutting through the insulation and nicking the strands of the conducting core of the wire.

Links 448, 448' are pivoted at their ends to levers 450, 450' and these levers in turn are pivoted on bracket 398 between the upstanding ears thereof. The opposite ends of these levers are pivotally connected by means of links 454 and 454' to an arm 456 of previously mentioned lever 404. It will be noted from FIGURE 15 that levers 450 and 450' are pivoted intermediate their ends on the same axis at 452 but that lever 450 is somewhat longer than lever 450'. It will also be noted that the pivotal connections on the opposite end of the levers, to the links 454, 454' are at different distances from the pivotal axis 406 of the lever 404. Since the two insulation cutting knives travel the same distance in cutting through the insulation of the wire and lead, the length of the lever 450 must be such that this equal distance of travel will be achieved in spite of the fact that the opposite end of the lever at 404 is closer to pivotal axis 406 than is the corresponding end of lever 450'. In other words, the unequal distances from pivotal axis 406 to lever 450 on the one hand and to lever 450' on the other hand is compensated by the unequal lengths of the levers 450 and 450' so that the two upper insulation cutting knives move substantially the same distance during a given cycle. In operation during each complete rotation of cam shaft 312, the upper insulation cutting knives and the upper severing blade are moved relatively downwardly in FIGURE 14 while the lower die and the lower insulation cutting knives are moved relatively upwardly. After severing and cutting the insulation cutting knives dwell for a brief period during which the slide members retract and withdraw the trailing end of the lead and the leading end of the wire from the severed sections of insulation. The carriers are then oscillated to position the crimped ends at the crimping stations described above. The stripped ends are swung laterally between the upper and lower guides and through notches 457, 457' in housings 366, 366' during this movement of the carriers. The cams 386 and 416 cause the blades and knives to move away from each other to permit feeding of the conductor during the next operating cycle. It should be mentioned that advantageously and in the preferred embodiment the upper severing blade 388 moves further and faster than the upper insulation cutting blades on the sides thereof as will be apparent from an inspection of FIGURE 15 and a consideration of the relative lengths of the lever arms of levers 450, 450', and 396. Such differential movement as between the blade and the insulation cutting knives is desirable in order to dislodge any sections of insulation which might become jammed or otherwise lodged between these blades.

The disclosed method of severing and stripping the conductor by shearing along two planes and removing a short length of the conductor presents the advantage of accomplishing the severance of the wire without bending and without displacing either of the severed sections from the axis that they occupy at the time of feeding. Where wire is cut in a single plane as with some prior art devices, there is a tendency for the cut ends to be moved in opposite direction away from the original wire axis. This is undesirable, particularly where the insulation adjacent the cut ends is circumferentially cut and stripped by axially moving the cut ends away from each other past the insulation cutting knives. When the cut ends, which are bent or curved as a result of the single plane cutting, are pulled through the insulation cutting blades, damage may occur to the conducting core of the wire as it is scraped over the insulation cutters, for example, where stranded wire is being stripped, strands may be broken during the operation. Where the disclosed method of severing the wire along two parallel planes is employed, the cut ends are not moved out of axial alignment and remain straight and true so that during the ensuing stripping operation, damage to the strands is avoided.

After the cut ends have been stripped, it is desirable to remove the tubular sections of insulation which remain on each side of the shearing blade. During the movement of the insulating cutting knives and the shearing blade away from the wire feed path, the knives and blade move at different speeds, as previously mentioned and the tubular sections of insulation will be loosened or dislodged. These tubular sections are then removed by a stream of compressed air which enters housing 366 through a pair of passageways 451. The air stream issuing from these passageways is controlled by means of a solenoid valve which in turn is energized by means of a microswitch 461 and a cam 463 on shaft. The air flows across the path of wire feed and blows the tubular sections into an air stream issuing from a passageway 453 in housing 366' which carries them along the path of the arrows. Since the guideways 364, 360, do not meet they do not interrupt these air streams.

In the disclosed embodiment, the insulation cutting knives 418, 418' and 444, 444', are mounted in such manner that each pair can be moved independently of the other pair towards and away from the plane of severance of the wire. By virtue of this arrangement, the amount of insulation stripped from the trailing end of the lead and from the leading end of the wire can be adjusted to accommodate different sizes of terminals which may require varying lengths of stripped wire or lead for proper crimping.

The adjusting means for the insulation cutting knives is shown best in FIGURES 17, 19, 22 and 23. Since the adjusting means is associated with the blades 418, 444 is the same as the adjusting means associated with the blades 418', 444', only the adjusting means associated with the latter set of blades will be described in detail.

The plates 422' provide upper and lower wedge blocks 458', 459' on the surface which faces away from the plane of severance. These blocks have inclined or sloping dovetail grooves 468' which receive sloping dove tail projections 467' on one side of an adjusting block 462'. The opposite side of each adjusting block has a straight dove tail projection 464' which is received within a dove tail groove in housing 366'. Block 462' has a central projection 470 which extends within a slot 460 in the blocks 458', 459' so that the wedge blocks 462' each have a central section of sufficient width to receive an adjusting screw 472'. It will be apparent that as the two blocks 462' are moved towards each other (i.e. toward the wire axis) the plate 420' will be drawn away from the plane of severance of the conductor and if the blocks 462' are moved relatively away from each other the plate 420' will be moved relatively toward the plane of severance. Such movement of the blocks 462' towards each other and away from each other is achieved by means of threaded rods 472', 473' which extend through threaded openings of the blocks. Rod 472' extends upwardly through the top plate and rod 473' extends downwardly through the bottom plate. Each of the rods has a gear 474' on its end which gears mesh with idler gears 476 mounted on stub shafts on the top plate and beneath the bottom plate. These idler gears in turn mesh with gears 478 which are mounted on a shaft 480'. This shaft extends through the top plate and through the bottom plate and provides a knob 482' on its end so that rotation of this knob and the shaft 480' imparts rotation to the threaded rods 472', and 473' thereby to change the position of the insulation cutting knives. It will be apparent that since the two knives are independently adjustable, the apparatus can be quickly adjusted for any given terminal and different sizes of terminals requiring different lengths of stripped wire for proper crimping, can be accommodated on the trailing end of the lead and on the leading end of the wire.

The crimping presses are substantially alike and a description of one will therefore suffice for both. These presses comprise a frame mounted on surface 10 and having a shaft 486 extending through the top portion thereof, which shaft is coupled by means of a sprocket 488, a chain 490 which passes over an idler 492, to a sprocket 494 keyed to a stub shaft 496. This stub shaft in turn is coupled by means of sprockets 498, 502 and a chain 500 to the main power shaft 28 (FIGURE 3). An eccentric 504 on the end of shaft 486 fits within an eccentric strap or hub 506 having an extenson 508 from which a pin extends. This pin has a ball and socket pivotal connection 510 with the press ram 512 which is reciprocable between gibs 514. The crimping tooling is bolted to the lower end of ram 512 by means of bolts 516 and in the disclosed embodiment comprises a blade 518 for removing the short sections of strip between adjacent terminals, a wire barrel crimping die 520, and an insulation crimping die 522, the insulation crimping dies being retained in place by a holder 523 as is commonly known. Complimentary lower crimping dies or anvils are mounted on a lower die holder and are not specifically identified. It will be noted from FIGURE 27 that the crimping dies are oriented with their axes extending along a line at right angles to the center line of the press and the terminals are fed along a line extending in the same direction. The disclosed apparatus is adaptable to the feeding of terminals along an axis extending through the central part of the press (at right angles to the terminal feed paths shown in FIGURE 1) where the terminals in strip form are positioned in side-by-side relationship rather than in end-to-end relationship. It is desirable to provide means for moving the presses away from the wire severing and insulation cutting mechanism 8 in order to expose the central section of the apparatus for servicing. In the disclosed embodiment this can be accomplished by means of threaded rods 521, 521' which are rotatably secured to the press frames and which are threaded through bosses 519 on surface 10. The terminal feed mechanism feeds the terminals from reels along the paths indicated in FIGURE 1 and comprises a block 526 supported on a base plate secured by means of bolts 525 to the base of the press. Advantageously the slots through which these bolts extend are oversized to permit adjustment of block 526 towards and away from the crimping zone in order to permit operation with varying sizes of terminals. Such adjustment of the block is achieved by means of adjusting bolt 527 having circumferential recess into which a pin 531 in the base plate projects so that upon rotation of bolt 527 the block is moved towards or away from the crimping zone. An additional guide pin is provided in the portion of the block adjacent the crimping zone to insure accurate guidance of the block.

Guide gibs 528 are secured to the upper surface of the block in spaced apart parallel relationship to define the feed path for the terminals. A holddown device for applying a slight pressure to the strip of terminals is mounted on the block and comprises a flat plate 533 which extends across the feed path, having a pair of extensions 535 which extend downwardly on each side of the block and are connected at their lower ends. A spring 539 normally biases this holddown device downwardly so that a slight resilient pressure is applied against the strip of terminals. The holddown device may be raised when a new strip of terminals is being threaded into the apparatus by means of an extension having a cam 541 on the end thereof which cam bears against the top surface of an L-shaped bracket 530.

This L-shaped bracket has parallel bores at 532 and 534 and a cylindrical slide member 536 slidably received within bore 532 has a pair of ears 538 extending downwardly through a slot in the bracket which pivotally mount a feed finger 540. The feed finger is normally biased in a counterclockwise direction as viewed in FIGURE 30 by a spring 542 but can be moved during the back stroke in a clockwise direction to permit it to pass over the terminals in the strip. Slide member 536 is normally biased rightwardly in FIGURE 30 by means of a spring 546 anchored in an axial bore 534 and anchored at its opposite end to an ear 544 extending from the slide member through a slot.

A plunger 550 in bore 532 threadedly received an adjusting screw 551 the end of which bears against slide member 536 and the plunger is pivotally connected in turn to a lever 552 by means of an extension 554 extending laterally from the plunger. Lever 552 is received within a slot provided in the head of a pivot pin 554 which is adjustably mounted by means of a bolt 557, on a bracket 556 extending from the press frame. It should be noted that while lever pivots about pin 554, the slot permits limited longitudinal movement of the lever relative to the pivot point for reasons which will be discussed below. The end of lever 552 is pivoted at 560 to a link 562 extending from a slide member 564 with which it has a pivotal connection. This slide member is reciprocable in a groove provided in the press frame and has a cam track 566 which receives a cam follower 568 carried by the press ram. The cam track 566 is so shaped that slide 564 is moved, as viewed in FIGURE 30, from left to right (i.e. retracts) during the up stroke of the ram and from right to left during the down strokes of the ram. During the up stroke of the ram then, slide member 536 is retracted to the right under the influence of spring 546. During the down stroke of the ram, the plunger 530 pushes slide member 536 to the left as viewed in FIGURE 30 thereby to deliver the terminal on the end of the strip to the crimping station beneath the crimping dies. Since plunger 550 moves along a rectilinear path and pivot point 560 moves along a slightly arcuate path, the lever 552 is required to undergo some longitudinal movement during each cycle. Such movement of the lever is permitted by virtue of the slotted pin described above which functions as its pivotal axis.

A salient advantage of the disclosed terminal feeding device is that the feed finger 540 is always under the retarding influence of the spring 546 during the feeding stroke and the motion of the plunger 550 is positive in that it does not rely upon springs for the feeding stroke. With this arrangement, overfeeding of the terminals is substantially prevented since as soon as plunger 550 comes to rest, as it does near the end of the down stroke of the ram, further movement of slide member 536 and finger 540 is prevented by spring 546. In other words the inertia of plunger 536 is instantaneously damped and it comes to a halt at a precise position at the end of the feed stroke. In previous terminal feeding devices difficulty has been encountered with overfeeding where the actual feeding of the terminals depended upon a spring loaded finger.

The operation of the individual components has been described and need not be repeated, however, several points regarding the sequence of the operations should be noted. As shown by FIGURE 33, the carriers 6, 6' are lowered to position the stripped ends of the wire and lead in the terminals after they have been swung. These carriers are raised during the swinging of the carriers back to their aligned position so that feeding of the lead can be started immediately after the carriers have reached their aligned positions. The two carrier slides 146, 146' retract to strip the wire and lead at the same time, however, slide 146 undergoes a further retraction which starts prior to swinging of carrier 6. This further retraction is provided for the reason that when the terminal is crimped onto the wire, it is lengthened somewhat by longitudinal extrusion. A slight retraction of slide 146 after crimping permits the lengthened terminal to clear the tooling during the return of carrier 6. This further retraction is not required of slide 146' on carrier 6' since ejection of the lead by the compressed air blast starts when clamp 344 begins to open and this takes place before swinging of carrier 6' is started. The clamps 184, 186 on carrier 6 are not opened until carrier 6 has been swung to its aligned position for the reason that the wire must be fed only along the path through the severing and cutting mechanism 8 and the carrier 6'.

Changes in construction will occur to those skilled in the art and various apparent different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:
1. A wire stripping device comprising, a pair of normally aligned wire carriers, wire severing and insulation cutting means disposed between said carriers, each of said carriers having a slide member mounted thereon, said slide members being normally biased towards said severing and cutting means and each being movable away from said severing and cutting means, freely rotatable wire feed wheel means mounted on one of said slide members, continuously rotatable drive wheel means mounted on said one slide member and normally in driving engagement with said feed wheel means, camming means for disengaging said drive wheel means from said feed wheel means during movement of said one slide member away from said cutting and severing means, and clamping means on each of said slide members for clamping fed wire at the conclusion of feeding thereof.

2. Apparatus as set forth in claim 1 wherein said feed wheel means comprises a pair of freely rotatable feed rolls, and said drive wheel means comprises a pair of drive rolls each engageable with one of said feed wheels, said drive rolls being resiliently biased into engagement with said feed rolls and being movable out of engagement with said feed rolls by said camming means.

3. A wire stripping device comprising, a carrier, wire severing and insulation cutting means disposed adjacent said carrier, a slide member on said carrier normally biased towards said severing and cutting means but movable away from said cutting and severing means, freely rotatable wire feed rolls on said slide member, a pair of continuously rotatable drive rolls on said slide normally engageable with said feed rolls to drive said feed rolls in a wire feeding direction, cam means on said carrier for disengaging said drive rolls from said feed rolls during rethactile movement of said slide member, and clamping means on said slide member for clamping a fed wire at the conclusion of a feeding cycle.

References Cited in the file of this patent
UNITED STATES PATENTS

| | | |
|---|---|---|
| 2,497,112 | Andren | Feb. 14, 1950 |
| 2,592,276 | Harkbarth | Apr. 8, 1952 |
| 2,631,213 | Martines | Mar. 10, 1953 |
| 2,680,394 | Andren | June 8, 1954 |
| 2,688,133 | Berg | Sept. 7, 1954 |
| 2,880,635 | Harris | Apr. 7, 1959 |
| 2,884,825 | Eubanks | May 5, 1959 |
| 2,886,995 | Bach et al. | May 19, 1959 |
| 2,954,599 | Cootes et al. | Oct. 4, 1960 |

FOREIGN PATENTS

| | | |
|---|---|---|
| 715,091 | Great Britain | Sept. 8, 1954 |